(12) United States Patent
Hughes

(10) Patent No.: US 7,921,770 B2
(45) Date of Patent: Apr. 12, 2011

(54) CAN PRESS SYSTEM AND METHOD

(76) Inventor: Zachary Wayne Hughes, Pensacola, FL (US)

(*) Notice: Subject to any disclaimer, the term of this patent is extended or adjusted under 35 U.S.C. 154(b) by 221 days.

(21) Appl. No.: 12/319,451

(22) Filed: Jan. 7, 2009

(65) Prior Publication Data

US 2010/0101435 A1    Apr. 29, 2010

Related U.S. Application Data

(60) Provisional application No. 61/019,319, filed on Jan. 7, 2008.

(51) Int. Cl.
*B30B 9/06* (2006.01)
*A47J 19/00* (2006.01)

(52) U.S. Cl. ........ 100/110; 100/116; 100/135; 100/233; 99/508; D7/665

(58) Field of Classification Search ............ 100/37, 100/110, 116, 125, 126, 127, 902, 910, 135, 100/213, 230, 233, 234; 99/495, 508; D7/666, D7/667, 665
See application file for complete search history.

(56) References Cited

U.S. PATENT DOCUMENTS

| | | | | |
|---|---|---|---|---|
| 3,565,351 A * | 2/1971 | Ross et al. | | 241/99 |
| 3,946,662 A * | 3/1976 | Ross et al. | | 100/240 |
| 4,582,265 A * | 4/1986 | Petronelli | | 241/95 |
| 5,363,759 A * | 11/1994 | D'Ambrosio | | 100/110 |
| 5,372,063 A * | 12/1994 | Berg | | 100/110 |
| 5,419,250 A * | 5/1995 | Ferguson | | 99/495 |
| 5,560,289 A * | 10/1996 | Pernsteiner | | 100/34 |
| 6,227,104 B1 * | 5/2001 | Watkins, Jr. | | 100/110 |
| 6,234,074 B1 * | 5/2001 | Mangum | | 100/110 |
| 7,299,747 B2 * | 11/2007 | So | | 100/234 |
| 7,337,716 B2 * | 3/2008 | Scheel | | 100/213 |
| 2003/0106440 A1 * | 6/2003 | Nelson | | 100/110 |

* cited by examiner

*Primary Examiner* — Jimmy T Nguyen

(57) ABSTRACT

A can press system includes a base with a side wall, an open top and a bottom. A lid is movably connected with the base. A press, with an upper surface and a lower surface, is connected in spaced apart relation with the lid. The lower surface of the lid is smaller in diameter than the upper surface and the lower surface is connected with the upper surface by an edge such that the edge angles upward and outward from the lower surface to the upper surface.

14 Claims, 4 Drawing Sheets

CAN PRESS SYSTEM AND METHOD

CROSS REFERENCE TO RELATED APPLICATION

This application claims the benefit of previously filed U.S. provisional patent applications No. 61/019,319 filed Jan. 7, 2008 for a "Tuna Can Press". The Applicant hereby claims the benefit of this provisional application under 35 U.S.C. §119. The entire content of this provisional application is incorporated herein by this reference.

FIELD OF THE INVENTION

This invention relates to a can press system and method. In particular, in accordance with one embodiment, the invention relates, to a can press system including a base with a side wall, an open top and a bottom. A lid is movably connected with the base. A press, with an upper surface and a lower surface, is connected in spaced apart relation with the lid. The lower surface of the lid is smaller in diameter than the upper surface and the lower surface is connected with the upper surface by an edge such that the edge angles upward and outward from the lower surface to the upper surface.

BACKGROUND OF THE INVENTION

The invention relates to hand-held devices that are used to drain and discard the fluid from a can containing material. By way of example only, and not by limitation, the invention relates to a hand-held device used for draining and discarding oil from a can of tuna.

Normally, a consumer wants to remove the liquid from a can of tuna before using the meat on a sandwich, in a casserole, salad, or other type of dish. In order to do this, most people cut off the lid of the tuna can and press it into the tuna meat while turning the can and lid sideways to drain the fluid. This method is ineffective, and poses many problems, from both a functional and health related point of view.

The first functional problem is in the fact that the lid of the tuna can does not have any holes. Because of this, any pressure that is exerted onto the lid must be enough to force all of the tuna liquid to the outer edge of the lid before it is allowed to exit the can. What this means is that an enormous amount of pressure is required to remove all of the fluid. In many cases, the result of the user applying so much pressure unevenly across the surface of the lid is that the lid is bent. When this happens, the tuna meat and fluid can no longer be compressed by the user.

If the user does manage to supply enough pressure to remove the fluid and succeeds in not allowing the lid to bend, a new problem arises in the fact that the lid is now located near the bottom of the can and must be removed with another utensil. The utensil must then be washed, adding yet another step to the process.

The second functional problem is in the fact that this method does not incorporate any method of removing the fluid from the can without making a mess. Having to press the lid into the can and turn the can sideways always results in the user having to wash his hands and clean up the spilled liquid in the sink. For this reason, many people choose not to eat tuna as often as they would like.

The third functional problem is in the fact that many new types of can openers have been introduced to the market that do not open cans in the traditional way. Rather than the opener cutting the lid from the top, which allows the smaller cut lid to fit into the body of the can, the new openers cut the lid from the side of the upper most part of the can. This causes the lid to be the same exact diameter as that of the can, which does not allow the lid to be pushed into the can. Because of this, users with these types of can openers need an entirely new way of removing the fluid from the tuna.

The first health related problem is in the fact that whenever the user presses the lid of the tuna can into the meat, whether successfully or not, he is exposing his fingers and the dirty top of the lid of the can to the fluid and meat that is about to be eaten. When the meat is exposed to these elements, it is not rational to assume that the user will wash the meat, since doing so would only make the user have to repeat this entire process.

The second health related problem is in the fact that whenever a lid is pressed into a tuna can, a user must reach into the can to retrieve it. When a traditional can opener is used, it causes the edges of the lid to be sharp. Exposing the user to the sharp edges of the unclean tin can is generally considered a bad idea.

Various types of "compressors" and strainers are on the marketplace today. While many of the basic functions of the prior designs do the same things, they all contain inherent problems. The first of these problems relates to the inability of the devices to control the liquid that is extracted. While most of the current designs will successfully separate the liquid of the tuna can from the meat, they do nothing in terms of allowing the user to control the discarded fluid that is being extracted. Many of the prior designs simply allow the extracted fluid to pour over the sides, wrapping around to the bottom of the device. This creates a very messy uncontrolled stream of fluid.

The second of these problems relates to the inability of the devices to allow the user to keep his hands clean during the process, and while discarding the empty tuna can. In most of the current designs, the user must use his fingers to physically remove the can and hold it sideways in his hand to scrape out the dry meat. This is a problem.

The third problem arises from the fact that most of the current designs are simply too large for the average consumer. While most of the designs incorporate a long pair of leverage handles that must be squeezed together to extract the fluid, it simply proves too big to fit into an average kitchen drawer.

For these reasons, there is a need today for a hand-held device that will allow a user to remove the fluid of a tuna can in a controlled manner while requiring minimal pressure, allow for easy extraction of the dry meat, and allow the user to easily discard the empty can, all while keeping his fingers safe and clean. It, therefore, is an object of this invention to provide a means for effectively draining the fluid from a can of tuna, by way of example only and not by limitation.

It is also an objective of the invention to provide the user with an effective way of picking the device straight up from a flat surface.

It is also an objective of the invention to provide the user with an effective way of applying the minimal amount of necessary pressure to the tuna within the can.

It is also an objective of the invention to provide the user with an effective way of collecting the extracted fluid from the tuna before it exits the can, rather than immediately exiting the device upon position of full compression.

It is also an objective of the invention to provide the user with an effective way of controlling the discarded fluid that has been collected by the device.

It is also an objective of the invention to provide the user with an effective way of holding the compressed device and opening the top compression portion of it with one hand, so that the other may be used to extract the meat.

It is also an objective of the invention to provide the user with an effective way of extracting the dry meat from the tuna can while it is retained in the device.

It is also an object of the invention to provide the user with a way to complete the entire process of draining the fluid from a can of tuna, discarding the fluid, extracting the dry tuna from the can, and discarding the empty can while keeping his or her fingers clean and dry.

It is an object of the present invention to provide a device for draining a can of food that is easy to use.

It is also an important object of the invention to provide a device for draining a can of food that is effective at draining a fluid from the can.

Another object of the invention is to provide a device for draining a can of food that is effective at draining a fluid from the can while retaining the food in the can.

Still another object of the invention is to provide a device for draining a can of food that is adapted for draining the fluid from a can of tuna fish.

Still yet another object of the invention is to provide a device for draining a can of food that provides a mechanical advantage that increases the pressure that is applied to the food in the can.

Yet another important object of the invention is to provide a device for draining a can of food that provides a mechanical advantage that decreases the time that is required to drain the fluid from the can.

Still yet another important object of the invention is to provide a device for draining a can of food that is economical to manufacture.

Still one other important object of the invention is to provide a device for draining a can of food that is reliable, easy to use and easy to disassemble and clean.

SUMMARY OF THE INVENTION

Accordingly, the can press system of the present invention, according to one embodiment includes a base with a side wall, an open top and a bottom. A lid is connected with the base. A press, with an upper surface and a lower surface, is connected in spaced apart relation with the lid where the lower surface is smaller in diameter than the upper surface and the lower surface is connected with the upper surface by an edge such that the edge angles upward and outward from the lower surface to the upper surface.

As used herein, the term "spaced apart relation" is given its common and ordinary meaning that two items are connected with each other but that a gap is provided between them by the connection. Two ends of a bar bell, for example only and not by limitation, are connected to each other in spaced apart relation by means of the center gripping bar.

In another aspect of the invention, the base includes at least one opening in the side wall and the opening runs from the top of the side wall partially downward in the side wall toward the bottom. In another aspect, the base includes extended opening walls spaced apart from the side wall and forming a space outside of the side wall. In one aspect, the base includes a reservoir. In further aspect, a pouring lip is connected with the base.

In one aspect, legs are connected with the bottom of the base. In another aspect, four legs are provided and two of the four legs are longer than the other two legs. In another aspect, a finger grip is provided in the bottom of the base and in the lid. In another aspect, the lid at least partially covers the side wall. In one aspect, the press is smaller in diameter than the lid. In another aspect, the press includes a large number of holes.

According to another embodiment of the invention, a can press system includes a base with a wall, an open top and a bottom. A lid is movably connected with the base and a press, with an upper surface and a lower surface, is connected in spaced apart relation with the lid and the press is smaller in diameter than the lid.

In another aspect of this invention, the press includes an upper surface and a lower surface, and the lower surface is smaller in diameter than the upper surface and the lower surface is connected with the upper surface by an edge such that the edge angles upward and outward from the lower surface to the upper surface.

In one aspect, the base includes at least one opening in the side wall and the opening runs from a top of the side wall partially downward in the side wall toward the bottom. In another aspect, the opening in the base includes extended opening walls spaced apart from the side wall and forming a space outside of the side wall. In another aspect, a reservoir is provided in the base. In a further aspect, a pouring lip is connected with the reservoir. In one aspect, the lid at least partially covers the side wall and the reservoir.

According to another embodiment, a method for applying a press to a can includes the steps of providing a base with a side wall, an open top and a bottom, with a lid connected with the base and with a press, with an upper surface and a lower surface, connected in spaced apart relation with the lid where the press is smaller in diameter than the lid and then placing an open can in the base and moving the lid such that the press is pressed into contact with material within the open can. In one aspect of this invention, the press includes a large number of holes.

DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE INVENTION

Figure 1:
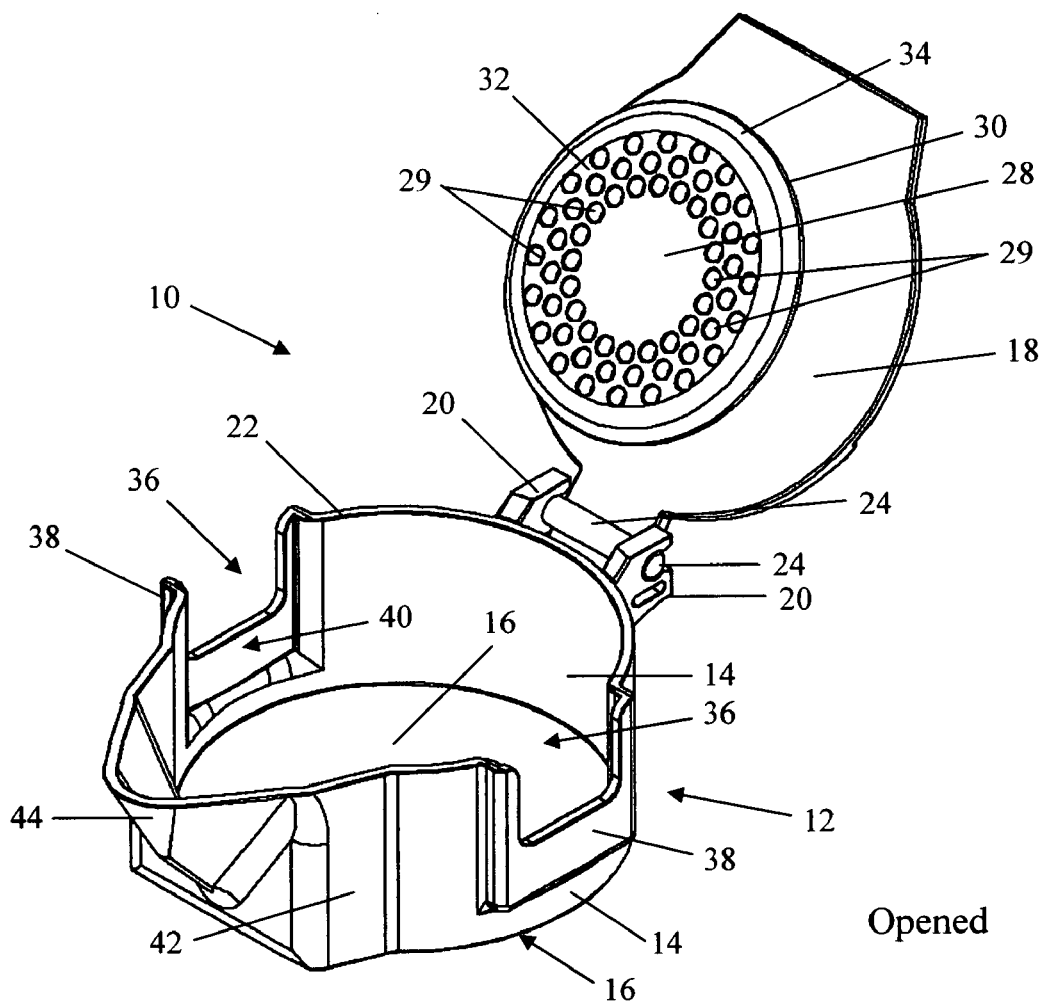
FIG. 1 is a side perspective view of the can press apparatus according to one embodiment in the open position.

The preferred embodiment of the present invention is illustrated by way of example in FIGS. 1-8. With specific reference to FIGS. 1 and 2, can press apparatus 10, according to one embodiment, includes a base 12 with a side wall 14 and a bottom 16. Base 12 is preferably cylindrical in form in that it is to be used, for example only and not by limitation with cylindrical shaped cans. Cans of tuna, again by way of example only, are cylindrical in form and base 12 is created in that form as well. Other cans and containers in forms other than cylindrical are included within the scope of the invention as well obviously.

Preferably, base 12 is slightly larger in diameter than the can, or any other object, it is to be used with as will be discussed more fully hereafter. Again, can press apparatus 10 may take on any useful form now known or hereafter developed and still function as illustrated and, again, as will be more fully described herein.

Side wall 14 forms an upstanding surface extending from bottom 16 and forms a receptacle within which a can is placed and by means of which the can is held in place as illustrated.

A lid 18 is movably connected with base 12. Preferably, a pair of lid supports 20 are connected with base 12, as to side wall 14, near the top edge 22 of side wall 14. Lid arm 24 is connected with lid 18 and is conformed to movably connect with lid supports 20. Finger button 26 is connected to lid 18 after lid arm 24. Pressure on finger button 26 causes lid 18 to rotate upward with the rotation of lid arm 24 within lid supports 20 from a closed position shown in FIG. 2 to the open position in FIG. 1.

Figure 2:
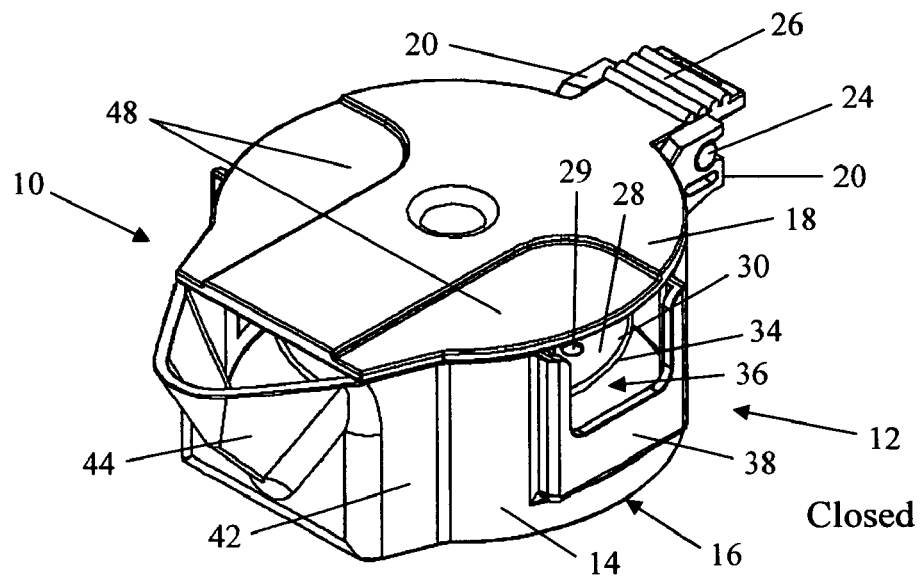
FIG. 2 is a side perspective view of the invention of FIG. 1 in the closed position.
Figure 5:
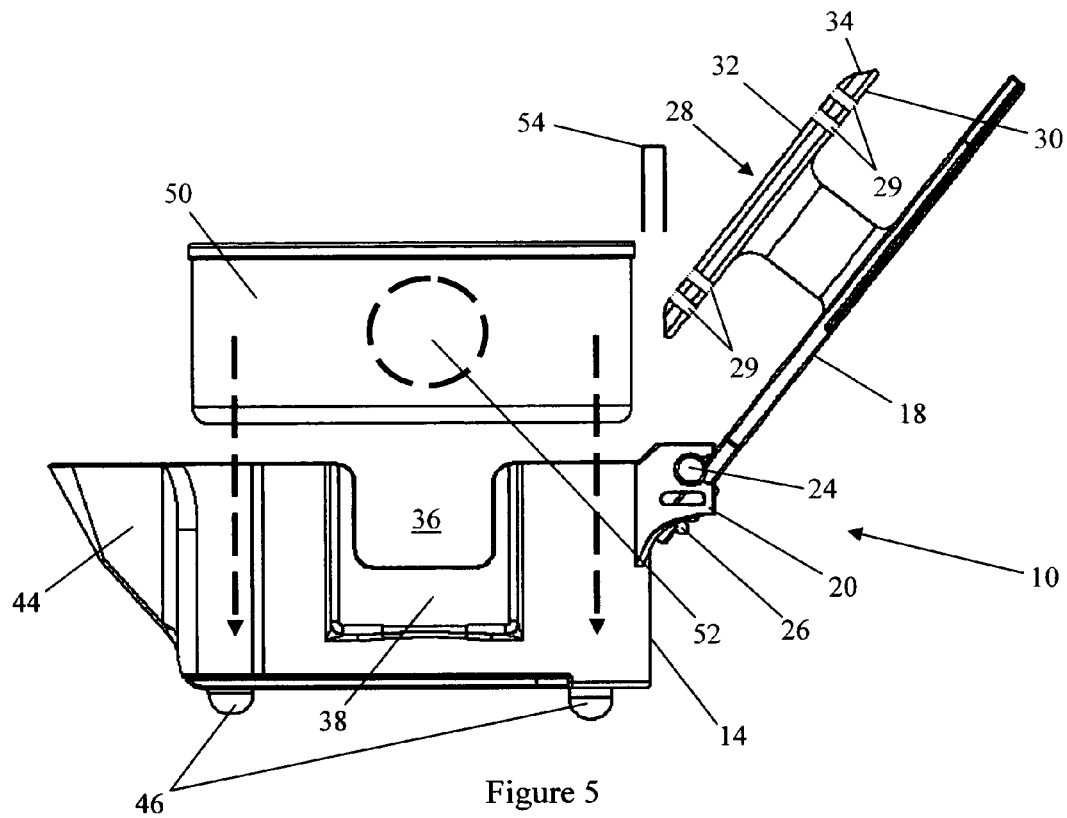
FIG. 5 is a side cut away view of the invention of FIG. 1 in the open position and a lidless can in position to be placed within the apparatus.

Still referring to FIGS. 1 and 2, press 28 is shown connected in spaced apart relation to lid 18 (See also FIG. 5). FIG. 2 shows that the lid 18 and the press 28 include a space between them. Thus, when the lid 18 is in the closed position shown in FIG. 2, press 28 is inside side wall 14 and some distance toward the bottom 16 of base 12, as will be discussed more fully hereafter. Preferably, press 28 is smaller in diameter than lid 18 as clearly shown in FIG. 1. This allows press 28 to be pressed into a can (see FIG. 7A-F) while lid 18 contacts side wall 14 as will be discussed more fully hereafter.

Preferably, press 28 includes one or more holes 29 through which fluid, such as oil in a can of tuna, passes as the press 28 is forced into a can, again as will be described more fully hereafter. Also preferably, press 28 includes an upper surface 30 and a lower surface 32 and the lower surface 32 is smaller in diameter than the upper surface 30. The lower surface 32 is connected with the upper surface 30 by an edge 34 such that the edge 34 angles upward and outward from the lower surface 32 to the upper surface 30 as shown. This creates a "beveled" edge 34 that is angled so as to present the smaller diameter lower surface 32 first when it is moved to the closed position shown in FIG. 2. As will be discussed more fully hereafter with regard to FIG. 6, this enables press 28 to engage a can with a misshaped opening and/or to center the can within the apparatus 10 prior to commencing with a pressing action.

FIGS. 1 and 2 also illustrate another aspect of the invention in the form of opening 36. Preferably, opening 36 is formed as a pair of openings that begin at the top edge 22 of side wall 14 and extend partially down the side wall 14 toward bottom 16 as illustrated. This feature enables a user to grasp a can and carefully place it fully within can press apparatus 10 without interference from the side wall 14. Further, when removing material from a can, opening 36 makes it much easier to control the can while it is still held within the can press apparatus 10, as will be more fully discussed hereafter with regard to FIGS. 5-8.

Preferably, opening 36 is formed in combination with extended opening walls 38 that are connected with side wall 14 but are spaced apart from side wall 14 so as to form a space 40 outside of side wall 14 as illustrated. Thus, extended opening walls 38 are used to create space 40 within which fluid that may escape a can within can press apparatus 10 is retained. This feature prevents spills by providing extra space for containing fluid within base 12.

Still referring to FIGS. 1 and 2, another aspect of the invention includes a reservoir 42 connected with base 12. Reservoir 42 extends outward from base 12 interrupting the circular form of the base 12, in this embodiment at least, and creates a large area within which fluid is captured and retained within base 12 as the lid 18 and press 28 combination are pressed toward the bottom 16, as will be described more fully with regard to FIGS. 7A-F.

Preferably a pouring lip 44 is connected with reservoir 42 such that fluid collected within reservoir 40 may be controllably released from reservoir 40.

FIGS. 1 and 2 also illustrate legs 46 connected with the bottom 16 of base 12. As more clearly shown in FIGS. 3 and 5, legs 46 raise can press apparatus 10 a distance above a supporting surface (not shown) thus enabling a user to grasp the bottom 16 while the can press apparatus 10 is resting on the surface. According to one aspect, four legs 46 are provided with a rear two legs 46 being longer than the front two legs 46 (see FIG. 5) such that even at rest, fluid within can press apparatus 10 flows toward the reservoir 42 at the front of can press apparatus 10.

FIG. 2 also illustrates an aspect of the invention in the form of a recessed finger grip 48 in the top surface of lid 18. Also, preferably, located in the outside surface of bottom 16 (see FIG. 3) finger grip 48 provides a secure place for a user to grasp can press apparatus 10 and apply pressure to lid 18 and/or bottom 16 so as to force press 28 into a can (not shown).

FIG. 2 also illustrates a preferred feature of the invention in that lid 18 is conformed to at least cover top edge 22 of side wall 14 and, preferably, reservoir 42. This creates a seal along the open top of base 12 and when held in the closed position shown in FIG. 2, causes fluid within can press apparatus 10 to flow to pouring lip 44.

Figure 3:
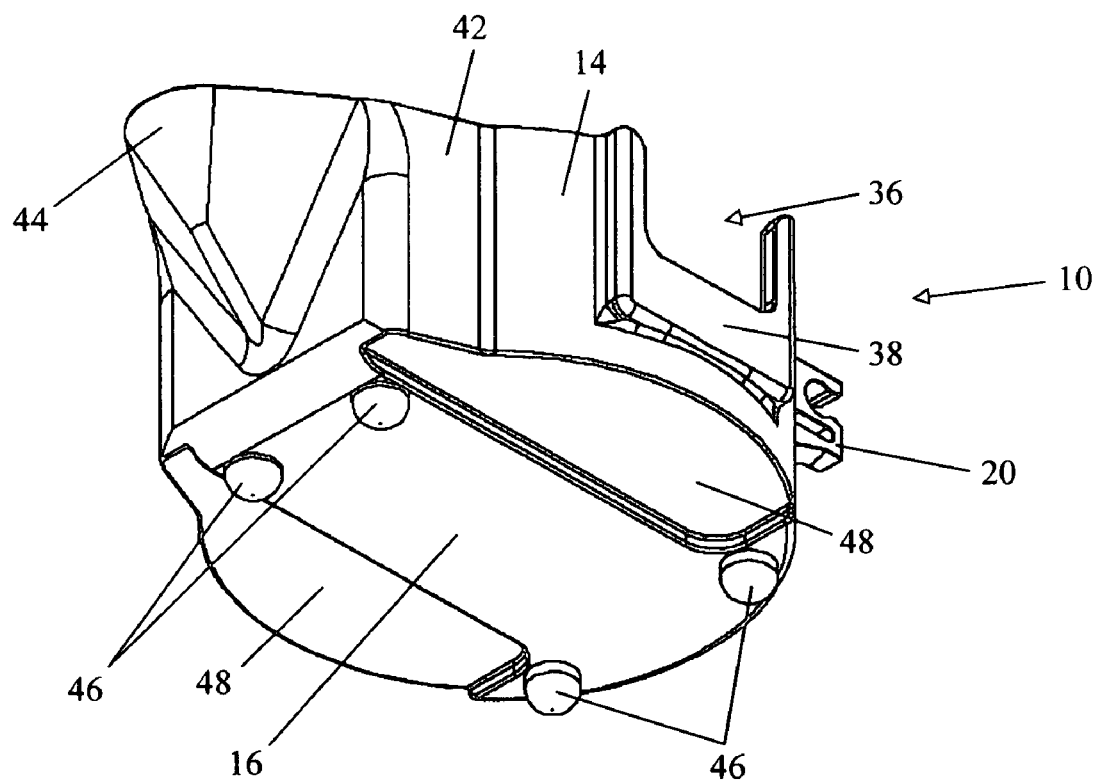
FIG. 3 is a bottom perspective view of the invention of FIG. 1 without the lid.
Figure 4:
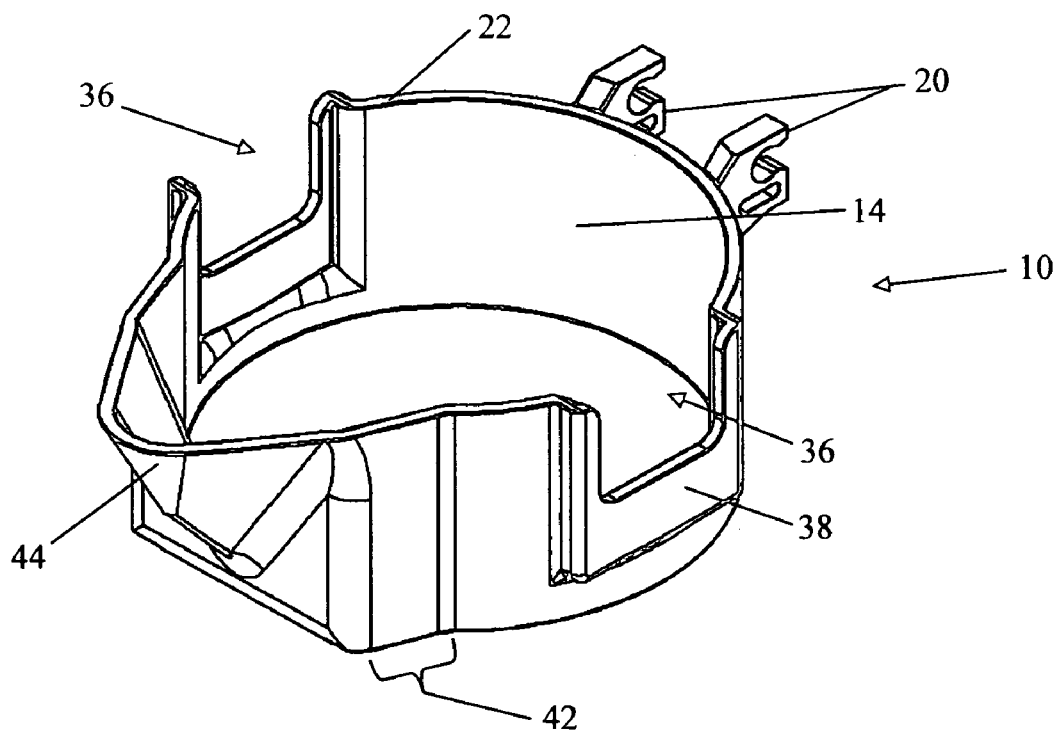
FIG. 4 is a top perspective view of the invention of FIG. 1 without the lid.

Referring now to FIGS. 3 and 4, the above described elements with regard to base 12 are illustrated using the same numerals for reference, as is the case for all the Figures. Here in particular with reference to FIG. 3 can be seen the aspect of the invention including four legs 46.

Figure 6:
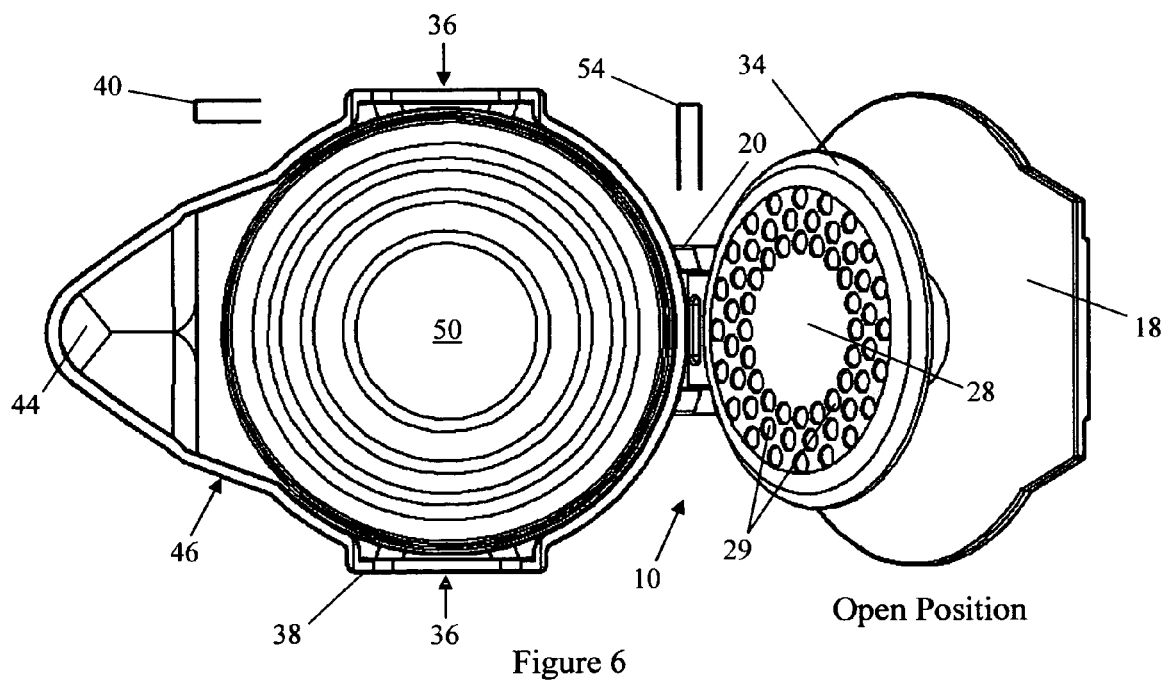
FIG. 6 is a top view of the invention of FIG. 5 showing the lidless can in place within the invention.

Referring now to FIGS. 5 and 6, FIG. 5 shows a side cut away view with the lid 18 in the open position and a lidless can 50. In use, whatever is placed within can press apparatus 10 has first had its lid removed. It is possible, of course, to cut the lid away and leave it in place or even to use the can press apparatus 10 to apply pressure to a can 50 with the lid in place, if that is desired. Nonetheless, preferably lidless can 50 is grasped by the side at the point indicated by the series of dots forming a circle 52 and lowered into base 12. Because of opening 36, this can be done without interference from side wall 14.

FIG. 5 also illustrates, and it should be noted, that the lid supports 20 are conformed to hold lid 18 and press 28 as small distance away, in the form of hinge gap 54, from the side wall 14. This prevents the lid 18 and/or press 28 from interfering with the can 50.

FIGS. 5 and 6 confirm the preferred aspects of the invention as discussed above, including that press 28 is of a smaller diameter than lid 18 and that lid 18 is formed so as to extend onto and perhaps over top edge 22 and reservoir 42, among other things.

Figures 7A, 7B, 7C:
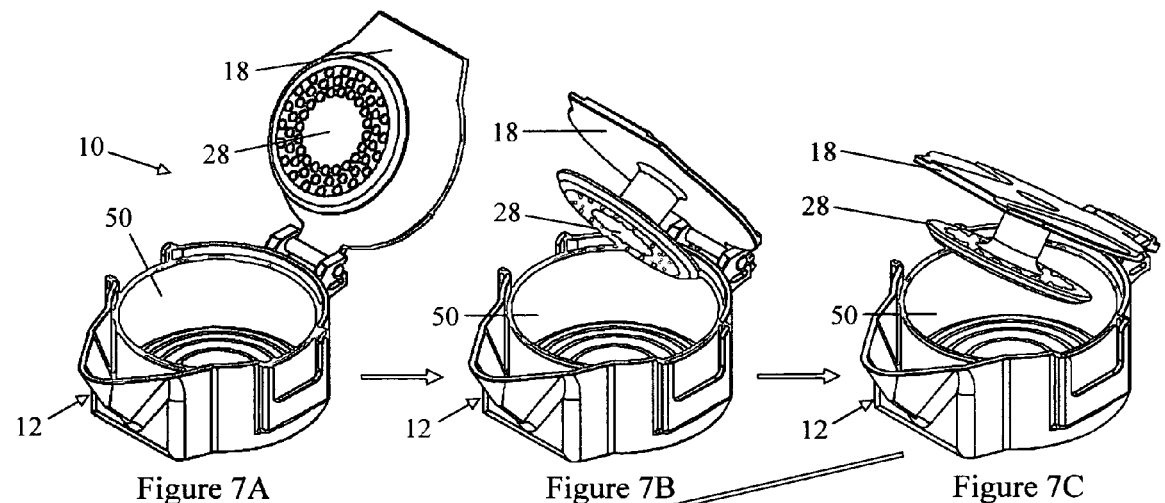
FIGS. 7A-F are perspective views showing the operation of the invention with a lidless can in place.

Referring now to FIGS. 7A-F, FIG. 7A shows the can press apparatus 10 in the open position with a lidless can 50 in place within base 12. FIG. 7B shows lid 18 being lowered. FIG. 7C shows the feature of edge 34 contacting can 50 initially and acting as a centering tool to position can 50 properly within base 12. Again, base 12 is conformed to be at least slightly larger in dimension than the can 50 with which it is to be used.

Thus, edge 34 smaller diameter lower surface 32 is moved into the open lidless can 50. As the lid 18 is continued to be lowered, press 28 rotates slightly back toward lid supports 20. At some point, edge 34 contacts the inside of can 50 and moves it back as well until can 50 is stopped by side wall 14.

Figures 7D, 7E, 7F:
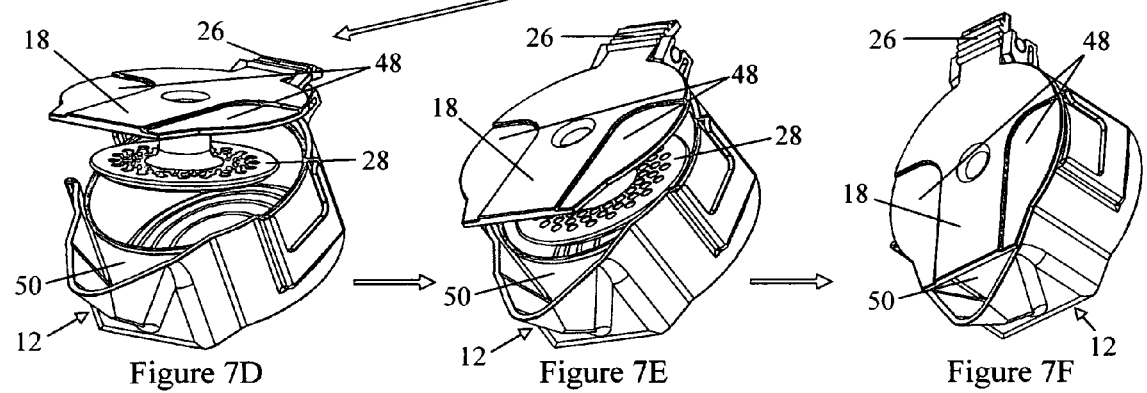

FIGS. 7D and E show the lid 18 and press 28 being pressed into can 50. In this regard, a user positions his or her fingers in finger grips 48 in the lid 18 and the bottom 14 and presses them together. Fluid in can 50 is collected in reservoir 42 and poured, in FIG. 7F, out of can press apparatus 10.

Figure 8:
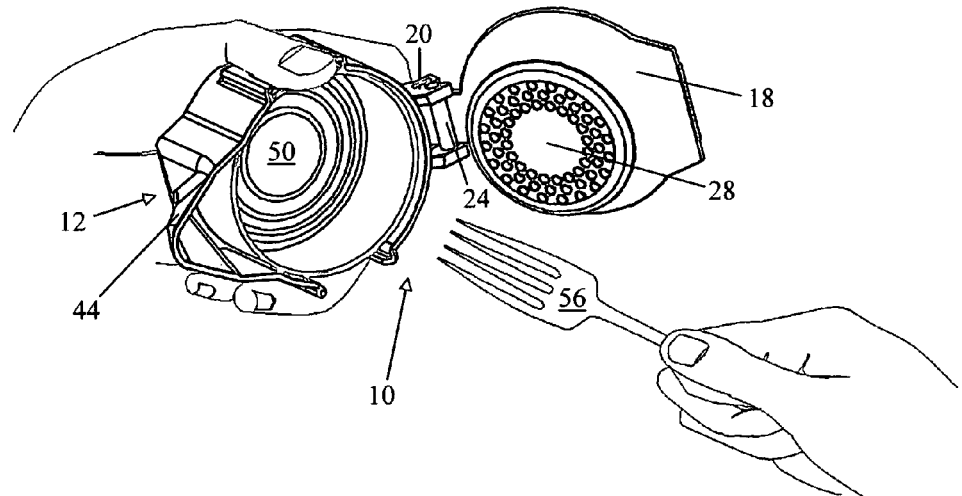
FIG. 8 is a perspective view of the invention at the end of the process shown in FIGS. 7A-F held by one hand in the open position and a user extracting pressed food from the lidless can with the other hand.

Referring now to FIG. 8, an important aspect of the invention is illustrated in the use of openings 36. To remove the fluid free material from can 50, a user presses can 50 against side wall 14 by pressing his thumb, as illustrated, directly onto can 50 through opening 36. The index finger is used to hold lid 18 and press 28 in the open position by means of the finger button 26 as the user removes the material from can 50 with fork 56, for example only. Thereafter, once all the material is removed from can 50, the user simply releases the pressure on can 50 and allows it to fall free of can press apparatus 10 and into a garbage receptacle, not shown. The user thus is prevented from ever coming in contact with the fluid in can 50.

The can press apparatus 10 is easily rinsed or washed, after which time it is once again ready for reuse. The can press apparatus 10 can be formed of any desired suitable material including, for example, metals, plastics, woods, synthetic materials, or combinations thereof. It is inexpensive to create and compact and easy to store and assemble.

The description of the present embodiments of the invention has been presented for purposes of illustration, but is not intended to be exhaustive or to limit the invention to the form disclosed. Many modifications and variations will be apparent to those of ordinary skill in the art. As such, while the present invention has been disclosed in connection with an embodiment thereof, it should be understood that other embodiments may fall within the spirit and scope of the invention as defined by the following claims.

What is claimed is:

1. A can press system comprising:
   a. a base with a side wall, an open top and a bottom, said base includes at least one opening in said side wall, said opening runs from a top of said side wall partially downward in said side wall toward said bottom, and said base further includes a plurality of extended opening walls spaced apart from said side wall and forming space outside of said side wall for retaining fluid that may escape from a can within said base, wherein each of said plurality of extended opening walls includes an opening runs from a top of said extended opening wall partially downward in said extended opening wall toward a bottom of said extended opening wall;
   b. a lid connected with the base; and
   c. a press for pressing into the can, said press includes an upper surface and a lower surface, and said press connected in spaced apart relation with said lid wherein said lower surface is smaller in diameter than said upper surface and said lower surface is connected with said upper surface by an edge such that said edge angles upward and outward from said lower surface to said upper surface.

2. The apparatus of claim 1 further including a reservoir in said base.

3. The apparatus of claim 1 further including a pouring lip connected with said base.

4. The apparatus of claim 1 further including legs connected with said bottom of said base.

5. The apparatus of claim 4 wherein said legs include four legs wherein two of said four legs are longer than the other two legs.

6. The apparatus of claim 1 further including a finger grip in the bottom of said base and in the lid.

7. The apparatus of claim 1 wherein said lid at least partially covers said side wall.

8. The apparatus of claim 1 wherein said press is smaller in diameter than said lid.

9. The apparatus of claim 1 wherein said press includes a plurality of holes.

10. A can press system comprising:
    a. a base with a side wall, an open top and a bottom, said base includes at least one opening in said side wall, said opening runs from a top of said side wall partially downward in said side wall toward said bottom, and said base further includes a plurality of extended opening walls spaced apart from said side wall and forming space outside of said side wall for retaining fluid that may escape from a can within said base, wherein each of said plurality of extended opening walls includes an opening runs from a top of said extended opening wall partially downward in said extended opening wall toward a bottom of said extended opening wall;
    b. a lid movably connected with the base; and
    c. a press for pressing into the can, said press includes an upper surface and a lower surface, and said press connected in spaced apart relation with said lid wherein said press is smaller in diameter than said lid.

11. The apparatus of claim 10 wherein said lower surface is smaller in diameter than said upper surface and said lower surface is connected with said upper surface by an edge such that said edge angles upward and outward from said lower surface to said upper surface.

12. The apparatus of claim 10 further including a reservoir in said base.

13. The apparatus of claim 12 further including a pouring lip connected with said reservoir.

14. The apparatus of claim 12 wherein said lid at least partially covers said side wall and said reservoir.

* * * * *